H. H. FREEMAN.
ANIMAL TRAP.
APPLICATION FILED FEB. 18, 1911.
1,004,007.
Patented Sept. 26, 1911.
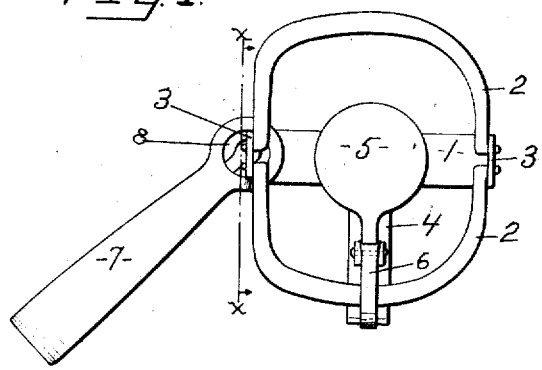
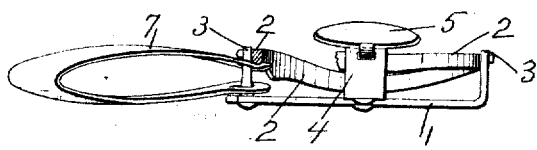
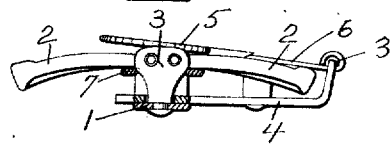
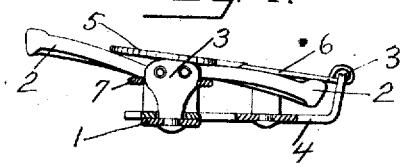
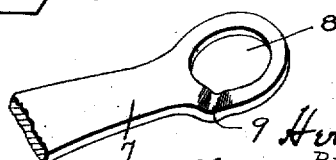
Witnesses:
R. W. Bailey.
E. J. Staub.
Inventor:
Herbert H. Freeman,
By Howard P. Denison
Attorney.

UNITED STATES PATENT OFFICE.

HERBERT HAWLEY FREEMAN, OF ONEIDA, NEW YORK, ASSIGNOR TO ONEIDA COMMUNITY, LIMITED, OF ONEIDA, NEW YORK, A CORPORATION OF NEW YORK.

ANIMAL-TRAP.

1,004,007.      Specification of Letters Patent.      Patented Sept. 26, 1911.

Application filed February 18, 1911. Serial No. 609,397.

*To all whom it may concern:*

Be it known that I, HERBERT HAWLEY FREEMAN, of Oneida, in the county of Madison, in the State of New York, have invented new and useful Improvements in Animal-Traps, of which the following, taken in connection with the accompanying drawings, is a full, clear, and exact description.

This invention relates to certain detail improvements in animal traps, and refers more particularly to the means for allowing one of the jaws to lie flat upon the ground or supporting surface.

Heretofore in the class of traps shown in the drawings it has been found that when the trap is set the jaw opposite the one which is engaged by the detent assumes a partially raised position, owing to the tension of the spring upon one end of the jaws, so that the animal can get its nose or paw under such jaw and thereby defeat the purpose intended. My purpose is, therefore, to obviate this objection and to that end my invention consists in the several new and novel features of construction and operation hereinafter described and specifically set forth in the claim hereunto annexed.

It is constructed as follows, reference being had to the accompanying drawings in which—

Figure 1 shows a top plan view of a trap embodying my features, showing the spring turned at an angle to the line of the jaws. Fig. 2 is an edge view thereof. Fig. 3 is a section on line X X in Fig. 1. Fig. 4 is a similar view, showing the position which the jaws would assume with the spring in its normal position at right angles to the adjacent ends of the jaws. Fig. 5 is a top view of one end of the upper leaf of the spring. Fig. 6 is an edge view thereof.

Similar letters of reference indicate corresponding parts in all the drawings.

The trap is formed of the usual base —1—, jaws —2—, having pintles pivoted in the upturned ears —3— of the base —1— and the usual crossbar —4— for supporting the tripping pan —5— and detent —6— all in the ordinary way, —7— is the usual retracting spring having apertures —8— for receiving the ears upon one end of the base and the jaws. Said retracting spring —7— is constructed in the usual way, except that upon one side it is provided with a depression —9—, best shown in Fig. 5. When the spring —7— is used without the depression —9— the side of the spring opposite of the detent —6— which engages the jaw, forces the jaw upward normally at about the angle shown in Fig. 4, and it is then free to be thrown over by the nose of the animal so as to assume any position, even to the extent of being almost superimposed upon the opposite jaw.

It will be observed that when the spring —7— is turned upon its axis the part of the upper leaf toward the closed end of the spring comes into engagement with the lower edge of the jaw —2—, thereby depressing the upper leaf sufficient to allow the opposite jaw to drop down to the position shown in Fig. 3. If there were no depression —9— in the spring —7— the tension would cause said spring —7— to return to its normal position, I have, therefore, placed the depression —9— in said spring —7— so that when the jaw —2— comes into engagement with it, it will hold it in the position shown in Fig. 1, thereby allowing the opposite jaw to take the position above specified.

It will be noted that even without the depression —9— the spring —7— may be forced around to the position shown in Figs. 1 and 2, but the tension of the spring is so great that it may right itself and engage the jaw and force it to the position shown in Fig. 4, and that the function of the depression —9— is to hold the jaw and the spring in the position shown in Fig. 1, thereby allowing the free jaw to drop down and assume a position as low, at least, as the opposite jaw, which is held by the detent and as shown in Fig. 3.

The essential feature of my invention, therefore, consists in providing means for holding the spring at some angle other than a right angle to the adjacent ends of the jaws, so as to allow the free jaw to be maintained in the same plane as the opposing jaw.

What I claim is:—

In an animal trap, a frame having a base, jaws pivoted therein, a detent suitably mounted and a tripping pan adapted to engage therewith and a retracting spring suitably mounted and adapted to engage the jaws, having a depression for holding the spring at an angle other than a right angle to the adjacent ends of the jaws when the trap is set.

In witness whereof I have hereunto set my hand on this 3rd day of February 1911.

HERBERT HAWLEY FREEMAN.

Witnesses:
S. S. ELDRIDGE,
V. K. HINDS.